United States Patent
Kawanishi et al.

(10) Patent No.: US 7,312,408 B2
(45) Date of Patent: Dec. 25, 2007

(54) GRANULAR MATERIAL WEIGHING HOPPERS CONTAINING PINCH VALUES OR FLIPPING-TYPE HOPPERS

(75) Inventors: Shozo Kawanishi, Nishinomiya (JP); Kazuo Usui, Akashi (JP); Mitsushi Nishikawa, Kakogawa (JP)

(73) Assignee: Yamato Scale Co., Ltd., Akashi-shi (JP)

( * ) Notice: Subject to any disclaimer, the term of this patent is extended or adjusted under 35 U.S.C. 154(b) by 0 days.

(21) Appl. No.: 10/493,511

(22) PCT Filed: Oct. 22, 2002

(86) PCT No.: PCT/JP02/10913

§ 371 (c)(1),
(2), (4) Date: Jul. 21, 2004

(87) PCT Pub. No.: WO03/036243

PCT Pub. Date: May 1, 2003

(65) Prior Publication Data

US 2004/0245027 A1      Dec. 9, 2004

(30) Foreign Application Priority Data

Oct. 22, 2001    (JP)    ............................. 2001-323087

(51) Int. Cl.
  *G01G 19/387*    (2006.01)
  *G01G 13/18*     (2006.01)
(52) U.S. Cl. ....................... 177/25.18; 177/105; 222/77
(58) Field of Classification Search ............. 177/25.18, 177/105; 222/77

See application file for complete search history.

(56) References Cited

U.S. PATENT DOCUMENTS

| 2,936,994 | A |   | 5/1960  | Lau |
| 2,963,994 | A | * | 5/1960  | Lau ............................ 177/118 |
| 2,963,258 | A | * | 12/1960 | Stambera .................... 177/105 |
| 3,308,898 | A | * | 3/1967  | Allen et al. .................. 177/64 |

(Continued)

FOREIGN PATENT DOCUMENTS

EP          0253895          1/1988

(Continued)

*Primary Examiner*—Randy W Gibson
(74) *Attorney, Agent, or Firm*—Alleman Hall McCoy Russell & Tuttle LLP

(57) ABSTRACT

Each of a plurality of scale units 10 that constitute a combination weigher is provided with a cut gate 11 attached to a lower portion of a powdery- or granular-material hopper 12, a feeding hopper 13 for temporarily retaining a powdery or granular material supplied from the cut gate 11, a gate-type weighing hopper 14 for weighing the powdery or granular material supplied from the feeding hopper 13, and a collecting chute 16 for collecting the powdery or granular material discharged from each weighing hopper 14 and supplying it to a wrapping machine or the like. A load cell 15 is attached to the weighing hopper 14, and the load cell 15 measures the weight of the powdery or granular material for performing combinatorial computing between the weighing hoppers 14. A dust-preventing bellow 18 is provided in between the respective constituting components: the cut gate 11, the feeding hopper 13, the weighing hopper 14, and the collecting chute 16. This makes available a powdery- or granular-material weighing apparatus capable of weighing a powdery or granular material at high speed.

6 Claims, 13 Drawing Sheets

U.S. PATENT DOCUMENTS

| | | | |
|---|---|---|---|
| 3,467,151 A | * | 9/1969 | Vogt ............................. 141/67 |
| 4,396,078 A | | 8/1983 | Minamida et al. |
| 4,421,185 A | * | 12/1983 | Koto et al. ............... 177/25.18 |
| 4,531,597 A | * | 7/1985 | Focke et al. ................... 177/84 |
| 4,537,229 A | * | 8/1985 | Sashiki et al. ................. 141/83 |
| 4,569,406 A | * | 2/1986 | Pringle et al. ............ 177/25.18 |
| 4,574,897 A | | 3/1986 | Minamida et al. |
| 4,615,403 A | * | 10/1986 | Nakamura ............... 177/25.18 |
| 4,662,508 A | * | 5/1987 | Inoue et al. ................. 198/601 |
| 4,674,581 A | * | 6/1987 | Kammler et al. ........ 177/25.18 |
| 4,676,326 A | | 6/1987 | Konishi |
| 4,681,176 A | * | 7/1987 | Moran et al. ............... 177/114 |
| 4,846,291 A | * | 7/1989 | Osawa et al. ............ 177/25.18 |
| 4,979,608 A | * | 12/1990 | Mikata et al. ............... 198/566 |
| 5,054,652 A | * | 10/1991 | Oshima et al. ................. 222/1 |
| 5,127,483 A | * | 7/1992 | Hough ......................... 177/70 |
| 5,319,160 A | | 6/1994 | Nambu |
| 5,322,195 A | * | 6/1994 | Ellis ............................ 222/105 |
| 5,637,836 A | * | 6/1997 | Nakagawa et al. ......... 177/105 |
| 5,697,523 A | * | 12/1997 | Brandauer ................... 222/58 |
| 5,736,683 A | * | 4/1998 | Howard ................... 177/25.18 |
| 6,011,223 A | * | 1/2000 | Poller et al. ................ 177/105 |
| 6,111,206 A | * | 8/2000 | Maguire ....................... 177/60 |
| 6,268,571 B1 | | 7/2001 | Benyukhis |
| 6,444,926 B1 | * | 9/2002 | Ricciardi, Sr. ............... 177/16 |
| 6,462,288 B1 | * | 10/2002 | Wong ......................... 177/105 |

FOREIGN PATENT DOCUMENTS

| | | |
|---|---|---|
| JP | 49-61272 | 5/1974 |
| JP | 60165521 | 8/1985 |
| JP | 62-111525 | 5/1987 |
| JP | 62111525 | 5/1987 |
| WO | WO86/06161 | 10/1986 |

* cited by examiner (b)

GRANULAR MATERIAL WEIGHING HOPPERS CONTAINING PINCH VALUES OR FLIPPING-TYPE HOPPERS

TECHNICAL FIELD

The present invention relates to a powdery- or granular-material weighing apparatus, and more particularly to a powdery- or granular-material weighing apparatus in which charging of a powdery or granular material to a weighing portion is performed by charging the material in parts into a plurality of scale units constituting a combination weigher so that the weighing speed is increased.

BACKGROUND ART

Conventionally, two-stage charging system weighing apparatuses have been used for weighing powder or granular materials to improve weighing speed and increase weighing accuracy. FIG. 12 represents the relationship of charging weight and charging flow rate with charging time in a two-stage charging system. As shown in FIG. 12, in the two-stage charging system weighing apparatus, a powdery or granular material is supplied to a weighing hopper at a large flow rate until the measurement of the weight of the powdery or granular material reaches about 90% of a target weight (100%) (large quantity charging), and subsequently the remaining 10% of the powdery or granular material is supplied to the weighing hopper at a small flow rate (small quantity charging), in order to increase the weighing speed.

With such a weighing apparatus of a two-stage charging mode, conceivable methods for further increasing the weighing speed while maintaining its weighing accuracy are as follows: (1) the charging weight in the large quantity charging is further increased, for example, to 97% from about 90% as described above; or (2) the quantity of flow of a material to be weighed is increased in the large quantity charging. However, in the foregoing method (1), in which the charging weight in the large quantity charging is increased, overshoot occurs when the flow rate changes at the switchover from the large quantity charging to the small quantity charging, as shown in FIG. 13, resulting in a situation in which the target weight is assumed to be reached and the small quantity charging is not carried out. In this case, the weighed value obtained finally will be less than the target weight. Likewise, in the foregoing method (2), in which the flow rate in the large quantity charging is increased, overshoot also occurs when the flow rate changes at the switchover from the large quantity charging to the small quantity charging, resulting in a situation in which the weighed values obtained finally will be less than the target weight. Further, there is a drawback in that a control for the switchover from the large quantity charging to the small quantity charging is necessary, which increases the cost of the weighing apparatus. In addition, in order to ensure weighing accuracy, it is essential to carry out the small quantity charging, which is time-consuming, and the weighing speed cannot be increased beyond a certain level, which is another problem.

In order to resolve the problems in the weighing apparatus with a two-stage charging mode, a stageless system weighing apparatus has been developed. FIG. 14 represents the relationship of charging weight and charging flow rate with charging time in the stageless system. In the stageless system, its charging flow rate is adjusted so as to decrease continuously from the large quantity charging to the small quantity charging according to a predetermined function so that overshoot does not occur at the switchover from the large quantity charging to the small quantity charging. However, such a stageless system weighing apparatus has a drawback in that a control for the stageless shift from the large quantity charging to the small quantity charging is difficult and, for this reason, cost of the weighing apparatus increases. Also as in the foregoing case of the two-stage charging mode, there is a problem in that the time-consuming small quantity charging is essential to ensure weighing accuracy and therefore the weighing speed cannot be increased beyond a certain extent.

The present invention resolves the foregoing problems, and an object of the present invention is to provide a weighing apparatus capable of weighing a powdery or granular material as a material to be weighed at high speed.

DISCLOSURE OF THE INVENTION

The present invention is such that a combination weigher, which has conventionally been used for weighing materials to be weighed that have essentially discontinuous value of weight, such as candies and potato chips, is applied to the weighing of powdery or granular materials, which have essentially continuous value of weight. Specifically, a powdery- or granular-material weighing apparatus according to the present invention is for weighing a powdery or granular material within a predetermined allowable range of a target weight, characterized by comprising a plurality of scale units each for weighing a powdery or granular material, the plurality of scale units constituting a combination weigher which discharges the weighed material from the scale units which constitute a combination that attains, among totals for arbitrary combinations of a predetermined number of weighed values in the scale units, a total that is within the predetermined allowable range of the target weight.

By making use of a combination weigher for powdery or granular materials, which essentially have continuous weighed values, it becomes unnecessary to carry out the small quantity charging in supplying a powdery or granular material to the scale units, so that the weighing speed can be improved considerably. In addition, because the powdery or granular material that equates to a target weight of the entire scale can be charged in parts into a plurality of scale units and, moreover, the charging of the powdery or granular material can be performed simultaneously to each of the scale units, the weighing speed can be also improved. Furthermore, it becomes unnecessary to carry out the switchover from the large quantity charging to the small quantity charging, eliminating the need for a control device therefor and, thus, it becomes possible to reduce the cost of the scale.

In a powdery- or granular-material weighing apparatus of the present invention, each of the scale units is provided with a powdery- or granular-material supplying means for supplying the powdery or granular material to the scale units. The powdery- or granular-material supplying means is characterized by being selected from the group consisting of a cut gate, a belt feeder, a disk feeder, a screw feeder, a rotary feeder, an auger, a pinch valve, a wing feeder, a slat valve, a roll feeder, and a volumetric feeder.

In a powdery- or granular-material weighing apparatus of the present invention, each of the scale units constitutes a combination weigher, so that a variation in the weights of the powdery or granular material charged in respective scale units does not cause a problem even if it occurs, and a variety of low-cost powdery- or granular-material supplying means other than the feeders that are, as in conventional cases, capable of finely adjusting the charging quantity of a powdery or granular material can be adopted.

In addition, a weighing hopper for weighing a material to be weighed may comprise a cylindrical portion and a pinch valve for opening/closing a lower portion of the cylindrical portion, or may comprise a receiving container that receives the material to be weighed and flips upside down. By adopting a weighing hopper with such a configuration, it is possible to prevent leakage of the powdery or granular material from the gate, which is caused by the use of the gate used in the conventional combination weigher, in the case where the powdery or granular material is a fine powdery material with a high flowability.

In a powdery- or granular-material weighing apparatus of the present invention, which deals with a powdery or granular material as a material to be weighed, dust generation of powdery or granular material may cause a problem. In such cases, it is preferable to provide a dust generation-preventing means for preventing the powdery or granular material from generating dust in between such constituting components as a feeding hopper for temporarily retaining the material to be weighed supplied from the powdery- or granular-material supplying means, a weighing hopper for weighing the material to be weighed, and a collecting chute for collecting the weighed material discharged from each of the scale units and discharging it.

BEST MODE FOR CARRYING OUT THE INVENTION

Figure 1:
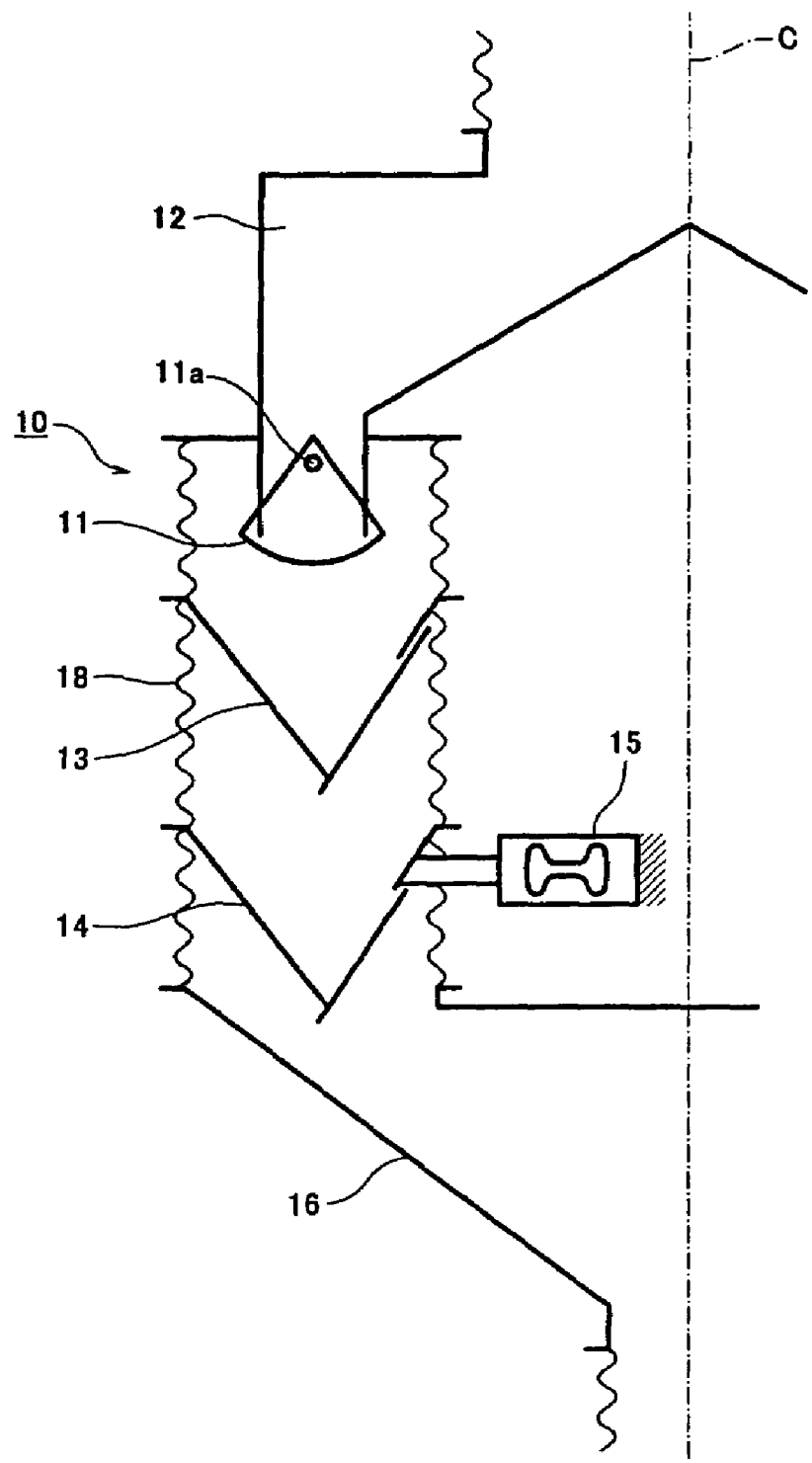
FIG. 1 is a schematic cross-sectional view of a powdery- or granular-material weighing apparatus having a cut gate serving as a powdery or granular material-supplying means, according to a first preferred embodiment of the present invention.

Hereinafter, preferred embodiments of the present invention are described with reference to the drawings. FIG. 1 is a schematic cross-sectional view showing a powdery- or granular-material weighing apparatus according to a first embodiment of the present invention. Although the figure illustrates the cross-section of only one of scale units 10 that constitute the powdery- or granular-material weighing apparatus, the powdery- or granular-material weighing apparatus of the present embodiment has a configuration in which a plurality of the scale units 10 are provided around a center line C as the center. The same also applies to later-described embodiments shown in FIGS. 2 to 11.

The scale unit 10 in the present embodiment is provided with a cut gate 11 serving as a powdery- or granular-material supplying means, and the cut gate 11 is attached to a lower portion of a powdery or granular material hopper 12 for guiding a powdery or granular material supplied from above to each of the scale units 10. By pivoting the cut gate 11 around an opening/closing center 11a, the powdery or granular material is supplied to a feeding hopper 13. The feeding hopper 13 serves the function of temporarily retaining the powdery or granular material supplied from the cut gate 11, and the cut gate 11 supplies the powdery or granular material to the feeding hopper 13, aiming at an individual target weight as the target for each of the scale units 10. The powdery or granular material supplied from the cut gate 11 to the feeding hopper 13 is supplied to a gate-type weighing hopper 14, which is positioned thereunder. The weighing hopper 14 is provided with a load cell 15, which measures the weight of the powdery or granular material within the weighing hopper 14, and the weighed value is sent to a control unit, which is not shown in the figure. Provided below the weighing hopper 14 is a collecting chute 16 that collects the powdery or granular material discharged from each weighing hopper 14 and supplies it to a wrapping machine or the like. In addition, in the present embodiment, a dust-preventing bellow 18 is provided in between the following respective constituting components: the cut gate 11, the feeding hopper 13, the weighing hopper 14, and the collecting chute 16.

In the powdery- or granular-material weighing apparatus of the present embodiment, the weighed value sent to the above mentioned control unit is used-for combinatorial computing along with the weighed values from the other scale units 10. Specifically, a predetermined number of the weighed values in the respective scale units is selected, the totals for those combinations are calculated and, among the totals, one that falls within a predetermined allowable range of a target weight is selected. Then, the powdery or granular material, which is the material to be weighed, is discharged from the scale units that constitute this total to the above-mentioned collecting chute 16.

In the powdery- or granular-material weighing apparatus of the present embodiment, a powdery or granular material is supplied from the cut gate 11 to the feeding hopper 13, aiming at the individual target weight for the scale unit 10 as the target and, during that time, the powdery or granular material is supplied to the feeding hopper 13 approximately at a constant flow rate without performing the large quantity charging and the small quantity charging, or similar controls, as in the conventional powdery- or granular-material weighing apparatus. Accordingly, the powdery or granular material is supplied to the weighing hopper 14 at high speed, and it is possible to increase the weighing speed of the powdery- or granular-material weighing apparatus as a whole. Moreover, because the powdery or granular material is simultaneously supplied to a plurality of the scale units 10, and because it is sufficient that the powdery or granular material be supplied aiming at the individual target weight, which is one part in several of the target weight, it becomes possible to reduce the feeding time of the powdery or granular material. Consequently, the weighing speed of the powdery- or granular-material weighing apparatus as a whole can be further increased. Further, with the powdery- or granular-material weighing apparatus of the present embodiment, assume that the powdery- or granular-material weighing apparatus of the present embodiment comprises, for example, 20 sets of the scale units 10. After a target weight within a predetermined allowable range has been initially attained by, for example, four sets of the scale units 10, if there still exists another combination of the scale units 10 that attains a total weight within the predetermined allowable range of the target weight among the remaining 16 sets of the scale units 10, the powdery or granular material can be discharged from those scale units 10 that constitute the other combination while the powdery or granular material is being supplied to the weighing hoppers 14 of those scale units 10 from which the powdery or granular material have been discharged previously, which results in a increasing weighing speed of the powdery- or granular-material weighing apparatus as a whole.

It should be noted that, although the feeding hopper 13 is provided between the cut gate 11 and the weighing hopper 14 in the present embodiment, it is possible to eliminate the feeding hopper 13 in cases where there is no leakage of the powdery or granular material from the cut gate 11. In addition, although the present embodiment employs the gate-type weighing hopper 14, it is possible to use a later described pinch valve-type weighing hopper shown in FIG. 7, a later described container-flipping-type weighing hopper shown in FIG. 9, and the like.

Figure 2:
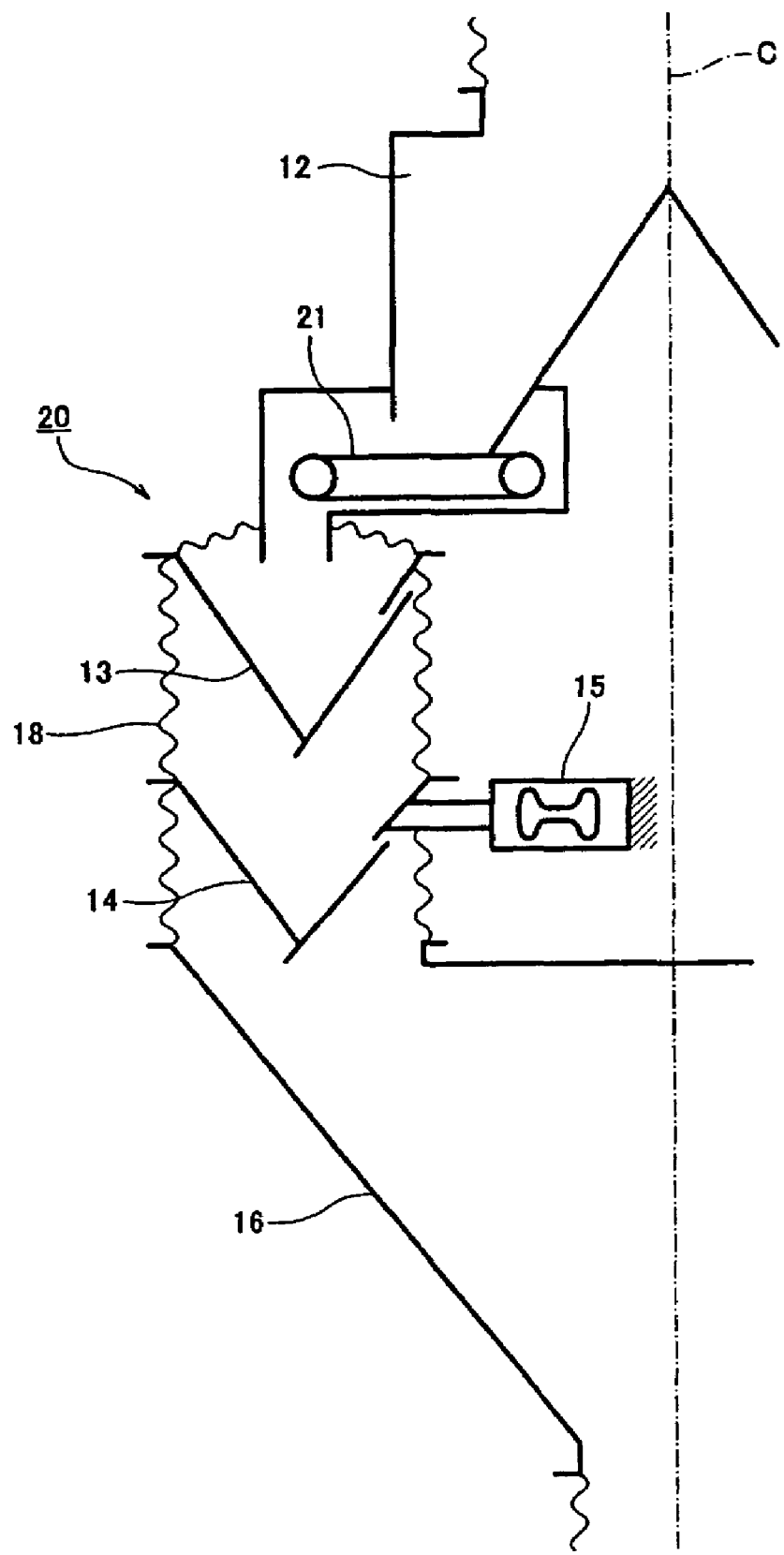
FIG. 2 is a schematic cross-sectional view of a powdery- or granular-material weighing apparatus having a belt feeder serving as a powdery or granular material-supplying means, according to a second embodiment of the present invention.

FIG. 2 is a schematic cross-sectional view of a powdery- or granular-material weighing apparatus according to a second embodiment of the present invention. Scale units 20 in the powdery- or granular-material weighing apparatus of the present embodiment are identical to the above described scale unit 10 shown in FIG. 1, except that a belt feeder 21 is used as a powdery- or granular-material supplying means in place of the cut gate 11 in the scale unit 10, and identical corresponding parts are denoted by the same reference numerals.

In the powdery- or granular-material weighing apparatus of the present embodiment as well, a powdery or granular material is supplied from the belt feeder 21 to the feeding hopper 13 aiming at the individual target weight for each scale unit 20 as the target and, during that time, the powdery or granular material is supplied to the feeding hopper 13 approximately at a constant flow rate without performing the large quantity charging and the small quantity charging, or similar controls. In addition, since the powdery or granular material is simultaneously supplied to a plurality of the scale units 20 and moreover it is sufficient that the powdery or granular material be supplied aiming at the individual target weight, which is one part in several of the target weight, it becomes possible to reduce the feeding time of the powdery or granular material. Furthermore, in the powdery- or granular-material weighing apparatus of the present embodiment too, when there exist a plurality of such combinations of the scale units 20 that the total weight of each of the combinations falls within a predetermined allowable range of a target weight, as in the powdery- or granular-material weighing apparatus of FIG. 1, it is possible to adopt a configuration in which the powdery or granular material is discharged from the scale units 20 that constitute another combination independently of the next supply of the powdery or granular material to the weighing hoppers 14.

It should be noted that, although the feeding hopper 13 is likewise provided between the belt feeder 21 and the weighing hopper 14 in the present embodiment, it is possible to adopt a configuration in which the feeding hopper 13 is not provided in cases where there is no leakage of the powdery or granular material from the belt feeder 21. In addition, although the present embodiment employs the gate-type weighing hopper 14, it is possible to use a later-described pinch valve-type weighing hopper shown in FIG. 7, a later-described container-flipping-type weighing hopper shown in FIG. 9, and the like.

Figure 3:
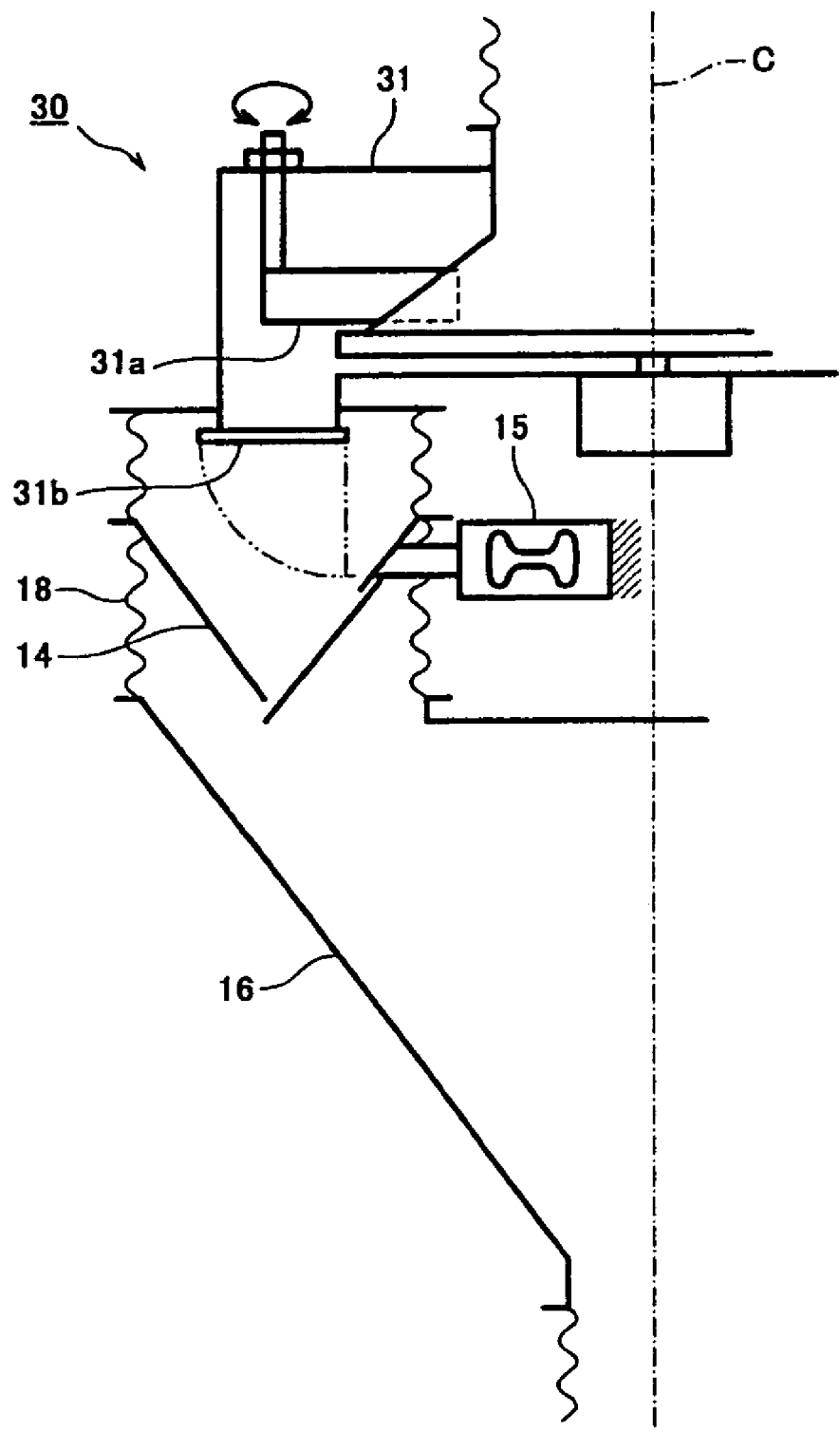
FIG. 3 is a schematic cross-sectional view of a powdery- or granular-material weighing apparatus having a disk feeder serving as a powdery or granular material-supplying means, according to a third embodiment of the present invention.

FIG. 3 is a schematic cross-sectional view of a powdery- or granular-material weighing apparatus according to a third embodiment of the present invention. Scale units 30 in the powdery- or granular-material weighing apparatus of the present embodiment are identical to the above-described scale unit 10 shown in FIG. 1, except that a disk feeder 31 is used as a powdery- or granular-material supplying means in place of the cut gate 11 in the scale unit 10 and that the feeding hopper 13 is not provided, and identical corresponding parts are denoted by the same reference numerals. In the powdery- or granular-material weighing apparatus of the present embodiment, a powdery or granular material is supplied to the weighing hopper 14 by rotating a scraper 31*a* of the disk feeder 31 and opening a discharging gate 31*b*.

In the powdery- or granular-material weighing apparatus of the present embodiment, a powdery or granular material is supplied from the disk feeder 31 to the weighing hopper 14, aiming at the individual target weight for each scale unit 30 as the target and, during that time, the large quantity charging and the small quantity charging, or similar controls, are not performed. In addition, since the powdery or granular material is simultaneously supplied to a plurality of scale units 30 and, moreover, it is sufficient that the powdery or granular material be supplied aiming at the individual target weight, which is one part in several of the target weight, it becomes possible to reduce the feeding time of the powdery or granular material. Moreover, in the powdery- or granular-material weighing apparatus of the present embodiment too, when there exist a plurality of such combinations of the scale units 30 that their total weights fall within the predetermined allowable range of the target weight, as in the powdery- or granular-material weighing apparatus of FIG. 1, it is possible to adopt a configuration in which the powdery or granular material is discharged from another combination of the scale units 30, independently of the next supply of the powdery or granular material to the weighing hopper 14.

It should be noted that, although the feeding hopper 13 is not provided in the present embodiment, it is possible to provide the feeding hopper 13 may be provided between the disk feeder 31 and the weighing hopper 14 in cases where there is leakage of the powdery or granular material from the disk feeder 31. In addition, although the present embodiment employs the gate-type weighing hopper 14, it is possible to use a later-described pinch valve-type weighing hopper shown in FIG. 7, a later-described container-flipping-type weighing hopper shown in FIG. 9, and the like.

Figure 4:
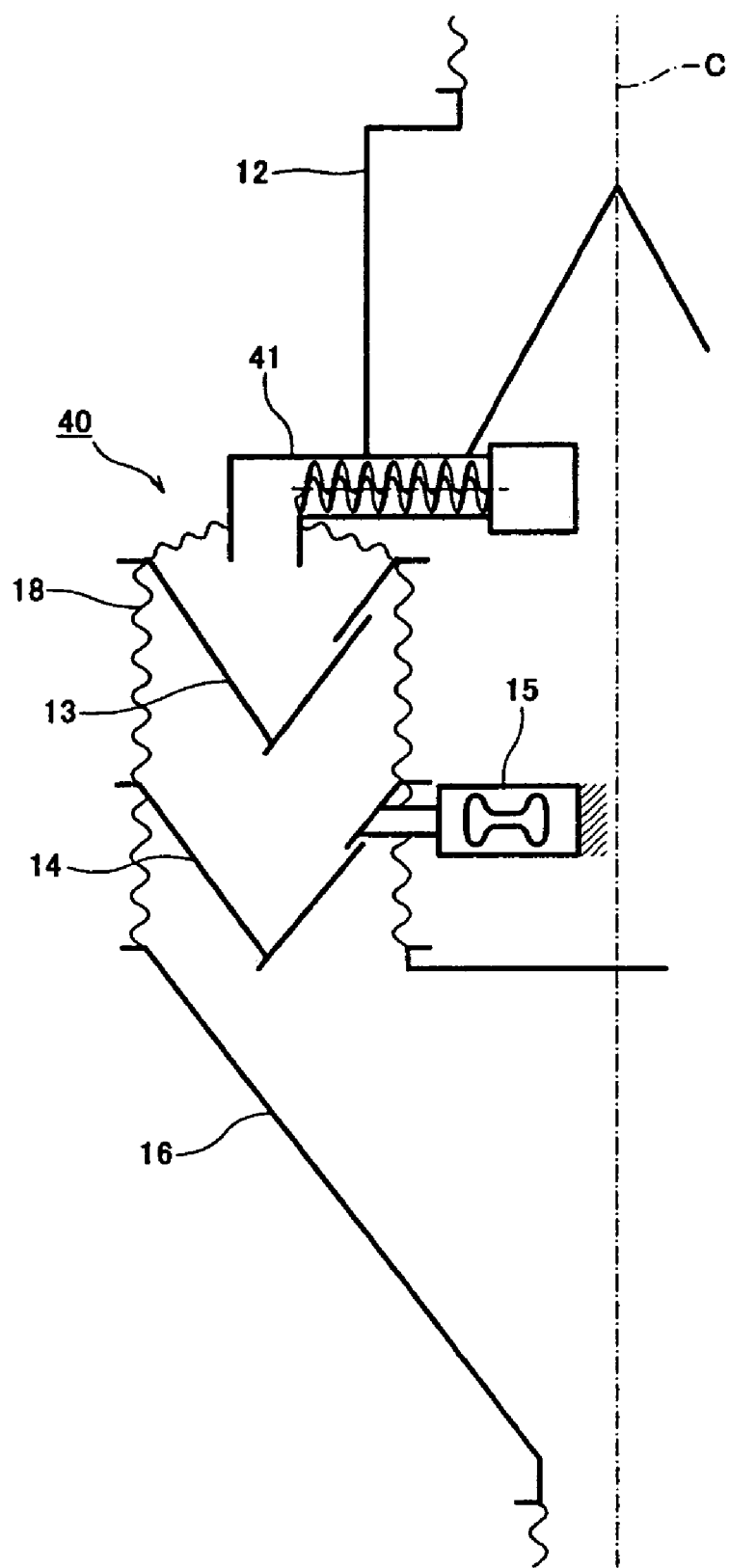
FIG. 4 is a schematic cross-sectional view of a powdery- or granular-material weighing apparatus having a screw feeder serving as a powdery or granular material-supplying means, according to a fourth embodiment of the present invention.

FIG. 4 is a schematic cross-sectional view of a powdery- or granular-material weighing apparatus according to a fourth embodiment of the present invention. Scale units 40 in the powdery- or granular-material weighing apparatus of the present embodiment are identical to the above-described scale unit 10 shown in FIG. 1, except that a screw feeder 41 is used as a powdery- or granular-material supplying means in place of the cut gate 11 in the scale unit 10, and identical corresponding parts are denoted by the same reference numerals.

In the powdery- or granular-material weighing apparatus of the present embodiment as well, a powdery or granular material is supplied from the screw feeder 41 to the feeding hopper 13, aiming at the individual target weight for each scale unit 40 as the target, and during that time, the powdery or granular material is supplied to the feeding hopper 13 approximately at a constant flow rate without performing the large quantity charging and the small quantity charging, or similar controls. In addition, since the powdery or granular material is simultaneously supplied to a plurality of the scale units 40 and, moreover, it is sufficient that the powdery or granular material be supplied aiming at the individual target weight, which is one part in several of the target weight, it becomes possible to reduce the feeding time of the powdery or granular material. Furthermore, in the powdery- or granular-material weighing apparatus of the present embodiment too, when there exist a plurality of such combinations of the scale units 40 that their total weights fall within a predetermined allowable range of a target weight, as in the powdery- or granular-material weighing apparatus of FIG. 1, it is possible to adopt a configuration in which the powdery or granular material is discharged from the scale units 40 that constitute another combination independently of the next supply of the powdery or granular material to the weighing hoppers 14.

It should be noted that although the feeding hopper 13 is provided between the screw feeder 41 and the weighing hopper 14 in the present embodiment, it is possible to adopt a configuration in which the feeding hopper 13 is not provided in cases where there is no leakage of the powdery or granular material from the screw feeder 41. In addition, although the present embodiment employs the gate-type weighing hopper 14, it is possible to use a later-described pinch valve-type weighing hopper shown in FIG. 7, a later-described container-flipping-type weighing hopper shown in FIG. 9, and the like.

Figure 5:
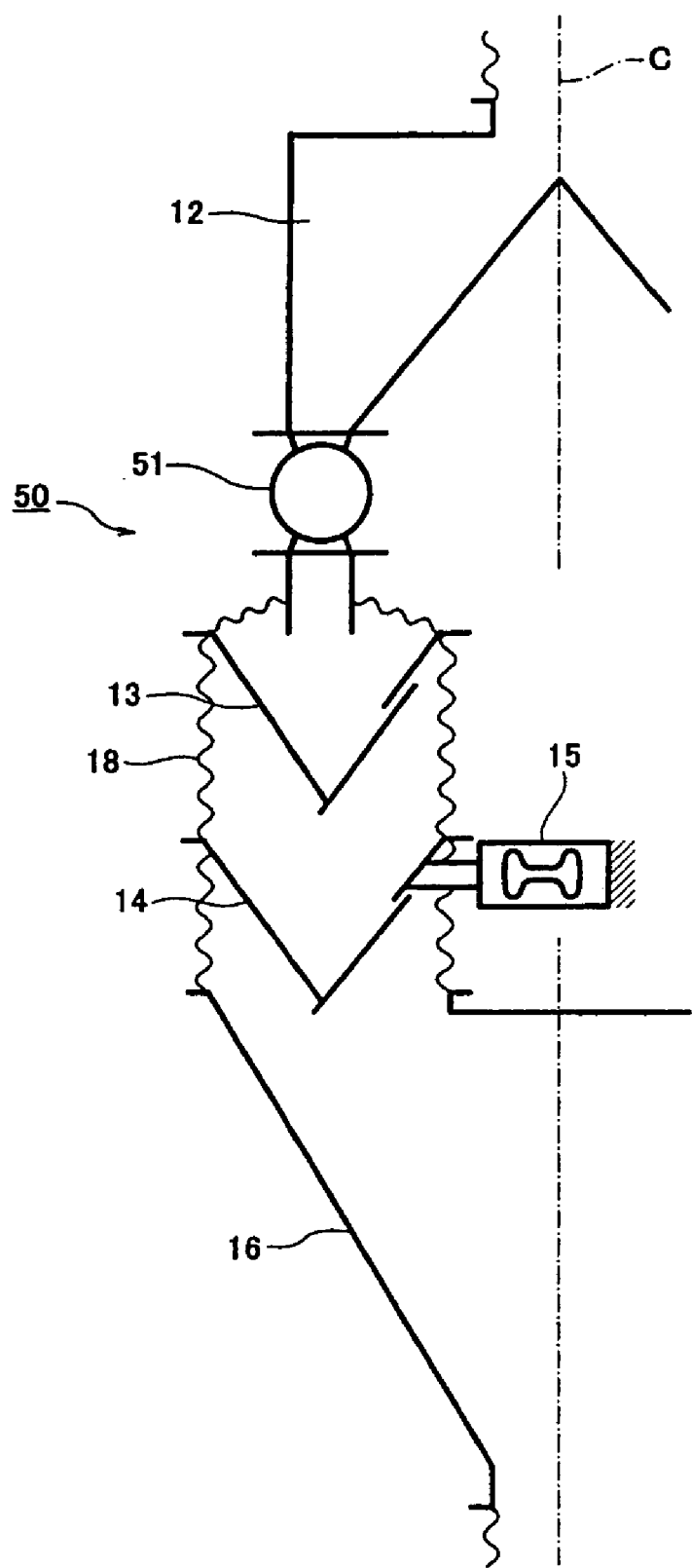
FIG. 5 is a schematic cross-sectional view of a powdery- or granular-material weighing apparatus having a rotary feeder serving as a powdery or granular material-supplying means, according to a fifth embodiment of the present invention.

FIG. 5 is a schematic cross-sectional view of a powdery- or granular-material weighing apparatus according to a fifth embodiment of the present invention. Scale units 50 in the powdery- or granular-material weighing apparatus of the present embodiment are identical to the above-described scale unit 10 shown in FIG. 1, except that a rotary feeder 51 is used as a powdery- or granular-material supplying means in place of the cut gate 11 in the scale unit 10, and identical corresponding parts are denoted by the same reference numerals.

In the powdery- or granular-material weighing apparatus of the present embodiment as well, a powdery or granular material is supplied from the rotary feeder 51 to the feeding hopper 13, aiming at the individual target weight for each scale unit 50 as the target, approximately at a constant flow rate without performing the large quantity charging and the small quantity charging, or similar controls. In addition, since the powdery or granular material is simultaneously supplied to a plurality of the scale units 50 and, moreover, the powdery or granular material is supplied aiming at the individual target weight, which is one part in several of the target weight, it becomes possible to reduce the feeding time of the powdery or granular material. Furthermore, in the powdery- or granular-material weighing apparatus of the present embodiment, too, when there exist a plurality of such combinations of the scale units 50 that their total weights fall within a predetermined allowable range of a target weight, as in the powdery- or granular-material weighing apparatus of FIG. 1, it is possible to adopt a configuration in which the powdery or granular material is discharged from the scale units 50 that constitute another combination independently of the next supply of the powdery or granular material to the weighing hoppers 14.

It should be noted that, although the feeding hopper 13 is provided between the rotary feeder 51 and the weighing hopper 14 in the present embodiment, it is possible to adopt a configuration in which the feeding hopper 13 is not provided in cases where there is no leakage of the powdery or granular material from the rotary feeder 51. In addition, although the present embodiment employs the gate-type weighing hopper 14, it is possible to use a later-described pinch valve-type weighing hopper shown in FIG. 7, a later-described container-flipping-type weighing hopper shown in FIG. 9, and the like.

Figure 6:
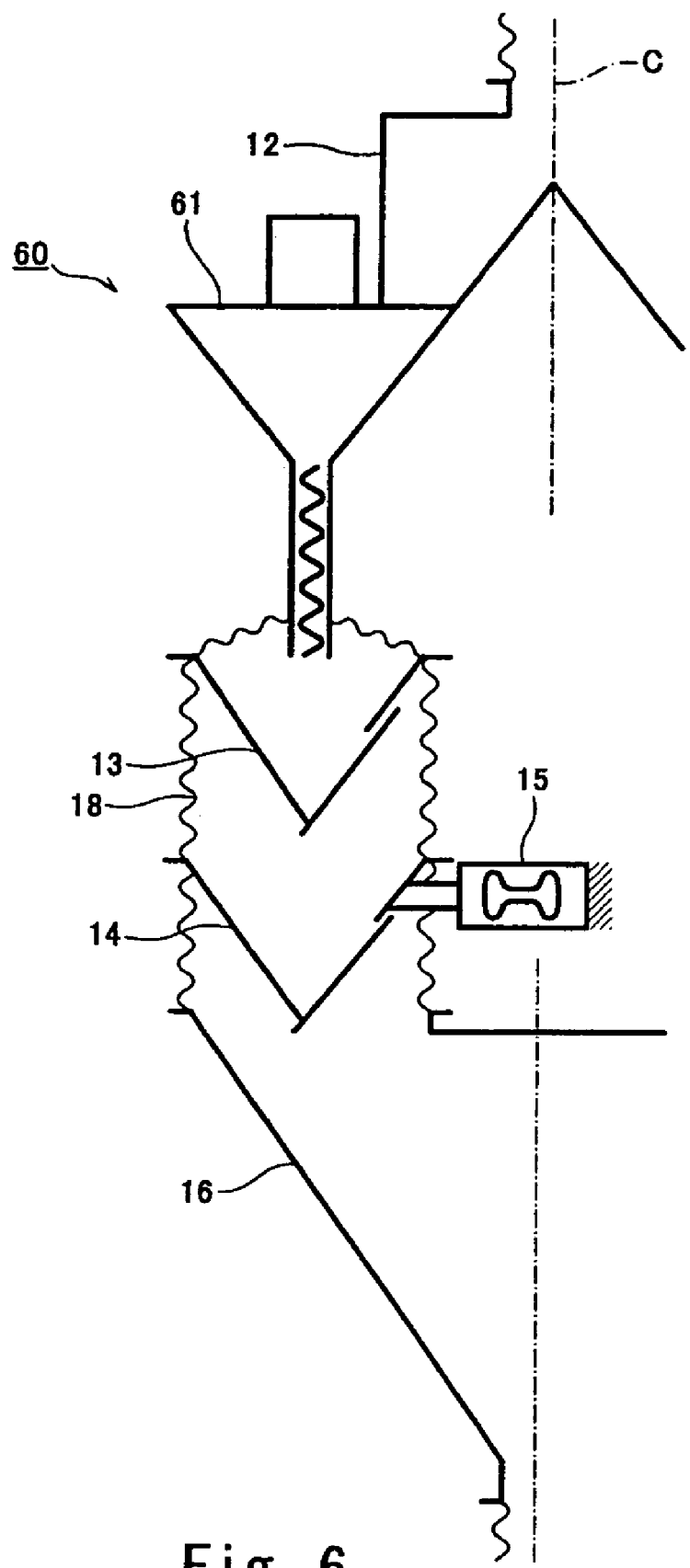
FIG. 6 is a schematic cross-sectional view of a powdery- or granular-material weighing apparatus having an auger serving as a powdery or granular material-supplying means, according to a sixth embodiment of the present invention.

FIG. 6 is a schematic cross-sectional view of a powdery- or granular-material weighing apparatus according to a sixth embodiment of the present invention. Scale units 60 in the powdery- or granular-material weighing apparatus of the present embodiment are identical to the above-described scale unit 10 shown in FIG. 1, except that an auger 61 is used as a powdery- or granular-material supplying means in place of the cut gate 11 in the scale unit 10, and identical corresponding parts are denoted by the same reference numerals.

In the powdery- or granular-material weighing apparatus of the present embodiment as well, a powdery or granular material is supplied from the auger 61 to the feeding hopper 13, aiming at the individual target weight for each scale unit 60 as the target, at a constant flow rate without performing the large quantity charging and the small quantity charging, or similar controls. In addition, since the powdery or granular material is simultaneously supplied to a plurality of the scale units 60 and, moreover, the powdery or granular material is supplied aiming at the individual target weight, which is one part in several of the target weight, it becomes possible to reduce the feeding time of the powdery or granular material. Furthermore, in the powdery- or granular-material weighing apparatus of the present embodiment, too, when there exist a plurality of such combinations of the scale units 60 that their total weights fall within a predetermined allowable range of a target weight, as in the powdery- or granular-material weighing apparatus of FIG. 1, it is possible to adopt a configuration in which the powdery or granular material is discharged from the scale units 60 that constitute another combination independently of the next supply of the powdery or granular material to the weighing hoppers 14.

It should be noted that although the feeding hopper 13 is provided between the auger 61 and the weighing hopper 14 in the present embodiment, it is possible to adopt a configuration in which the feeding hopper 13 is not provided in cases where there is no leakage of the powdery or granular material from the auger 61. In addition, although the present embodiment employs the gate-type weighing hopper 14, it is possible to use a later-described pinch valve-type weighing hopper shown in FIG. 7, a later-described container-flipping-type weighing hopper shown in FIG. 9, and the like.

Figure 7:
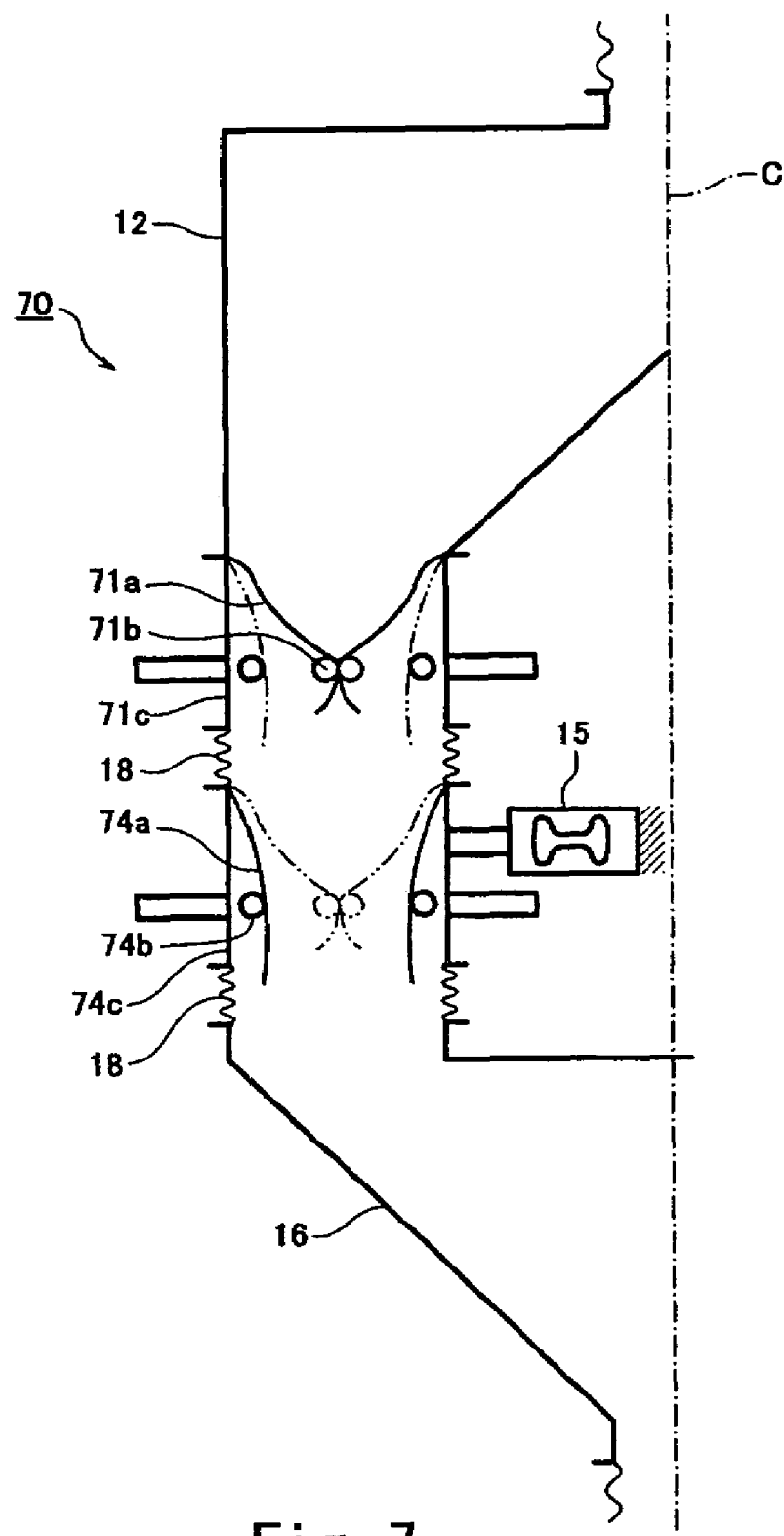
FIG. 7 is a schematic cross-sectional view of a powdery- or granular-material weighing apparatus having a pinch valve serving as a powdery or granular material-supplying means, according to a seventh embodiment of the present invention.

FIG. 7 is a schematic cross-sectional view of a powdery- or granular-material weighing apparatus according to a seventh embodiment of the present invention. A scale units 70 in the powdery- or granular-material weighing apparatus of the present embodiment is furnished with a cylindrical portion 71a attached to a lower portion of a powdery- or granular-material hopper 12, and a pinch valve 71b for opening/closing a lower portion of the cylindrical portion 71a and serving as a powdery or granular material-supplying means. The cylindrical portion 71a and the pinch valve 71b are mounted inside a stationary cylinder 71c. The powdery- or granular-material weighing apparatus of the present embodiment is also furnished with a cylindrical portion 74a and a pinch valve 74b for opening/closing a lower portion of the cylindrical portion 74a. The cylindrical portion 74a and the pinch valve 74b are mounted inside a stationary cylinder 74c. In the present embodiment, a weighing hopper is constituted by the cylindrical portion 74a and the pinch valve 74b. Further, a load cell 15 for measuring the weight of the powdery or granular material in the cylindrical portion 74a is attached outwardly of the stationary cylinder 74c. It should be noted that no feeding hopper is provided in the present embodiment. Furnished below the cylindrical portion 74a is a collecting chute 16 for collecting the powdery or granular material discharge from each cylindrical portion 74a and supplying it to a wrapping machine or the like. Further, in the present embodiment, dust-preventing bellows 18 are provided in between the following respective constituting components: the stationary cylinder 71c, the stationary cylinder 74c, and the collecting chute 16.

In the powdery- or granular-material weighing apparatus of the present embodiment as well, a powdery or granular material is supplied from the cylindrical portion 71a to the cylindrical portion 74a by opening the pinch valve 71b, aiming at the individual target weight for each scale unit 70 as the target, approximately at a constant flow rate without performing the large quantity charging and the small quantity charging, or similar controls. In addition, since the powdery or granular material is simultaneously supplied to a plurality of the scale units 70 and, moreover, the powdery or granular material is supplied aiming at the individual target weight, which is one part in several of the target weight, it becomes possible to reduce the feeding time of the powdery or granular material. Furthermore, in the powdery- or granular-material weighing apparatus of the present embodiment, too, when there exist a plurality of such combinations of the scale units 70 that their total weights fall within a predetermined allowable range of a target weight, as in the powdery- or granular-material weighing apparatus of FIG. 1, it is possible to adopt a configuration in which the powdery or granular material is discharged from the scale units 70 that constitute another combination independently of the next supply of the powdery or granular material to the cylindrical portions 74a.

Figure 9:
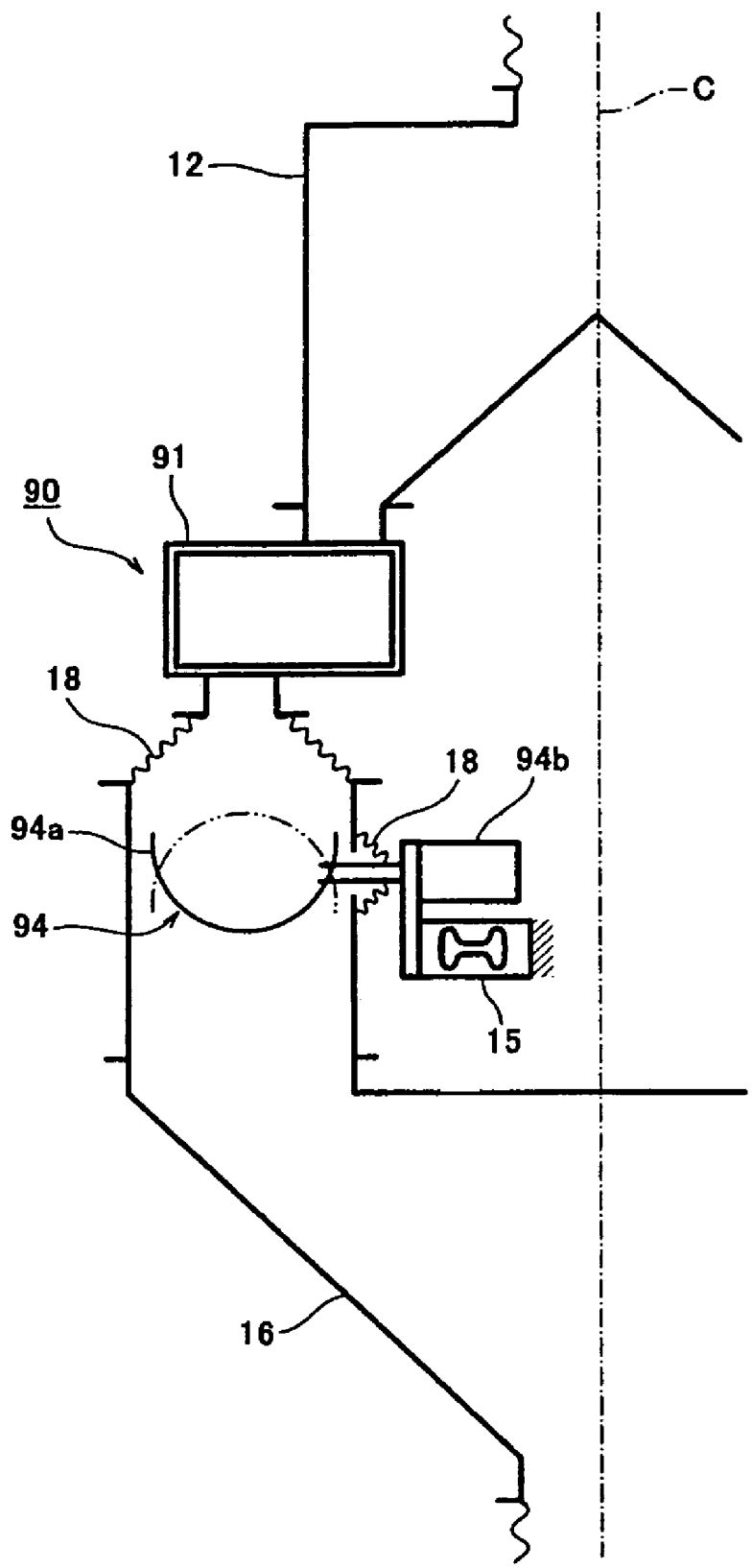
FIG. 9 is a schematic cross-sectional view of a powdery- or granular-material weighing apparatus having a slat valve serving as a powdery or granular material-supplying means, according to a ninth embodiment of the present invention.

It should be noted that, although a feeding hopper is not provided in the present embodiment, it is possible to provide a feeding hopper between the cylindrical portion 71a and the cylindrical portion 74a in cases where there is leakage of the powdery or granular material from the cylindrical portion 71a. In addition, although the present embodiment employs the pinch-valve type weighing hopper, it is possible to use a gate-type weighing hopper as shown in FIG. 1, a later-described container-flipping-type weighing hopper as shown in FIG. 9, and the like.

Figure 8:
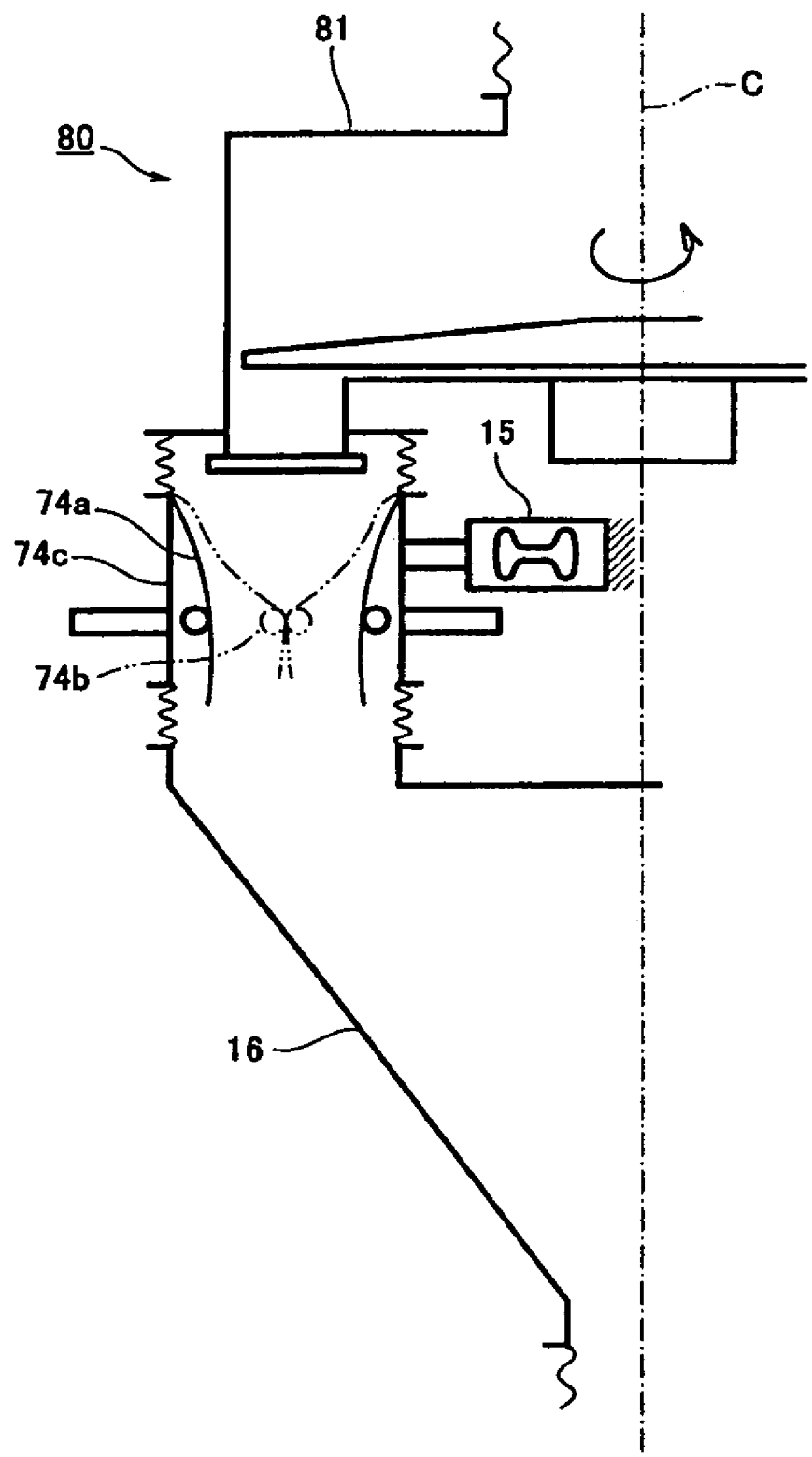
FIG. 8 is a schematic cross-sectional view of a powdery- or granular-material weighing apparatus having a wing feeder serving as a powdery or granular material-supplying means, according to an eighth embodiment of the present invention.

FIG. 8 is a schematic cross-sectional view of a powdery- or granular-material weighing apparatus according to an eighth embodiment of the present invention. Scale units 80 in the powdery- or granular-material weighing apparatus of the present embodiment are identical to the above-described scale unit 70 illustrated in FIG. 7, except that a wing feeder 81 is used as a powdery- or granular-material supplying means in place of the cylindrical portion 71a, the pinch valve 71b, and the stationary cylinder 71c in the scale unit 70, and identical corresponding parts are denoted by the same reference numerals.

In the powdery- or granular-material weighing apparatus of the present embodiment as well, a powdery or granular material is supplied to the cylindrical portion 74a by rotation of the wing feeder 81, aiming at the individual target weight for each scale unit 80 as the target, and during that time, the powdery or granular material is supplied approximately at a constant flow rate without performing the large quantity charging and the small quantity charging, or similar controls. In addition, since the powdery or granular material is simultaneously supplied to a plurality of the scale units 80 and moreover it is sufficient that the powdery or granular material be supplied aiming at the individual target weight, which is one part in several of the target weight, it becomes possible to reduce the feeding time of the powdery or granular material. Furthermore, in the powdery- or granular-material weighing apparatus of the present embodiment, too, when there exist a plurality of such combinations of the scale units 80 that their total weights fall within a predetermined allowable range of a target weight, as in the powdery- or granular-material weighing apparatus of FIG. 1, it is also possible to adopt a configuration in which the powdery or granular material is discharged from the scale units 80 that constitute another combination independently of the next supply of the powdery or granular material to the cylindrical portions 74a.

It should be noted that although a feeding hopper is not provided in the present embodiment, it is possible to provide a feeding hopper between the wing feeder 81 and the cylindrical portion 74a in cases where there is leakage of the powdery or granular material from the wing feeder 81. In addition, although the present embodiment employs the pinch-valve type weighing hopper, it is possible to use a gate-type weighing hopper as shown in FIG. 1, a later-described container-flipping-type weighing hopper as shown in FIG. 9, and the like.

FIG. 9 is a schematic cross-sectional view of a powdery- or granular-material weighing apparatus according to a ninth embodiment of the present invention. A scale unit 90 in the powdery- or granular-material weighing apparatus of the present embodiment is provided with a slat valve 91 attached to a lower portion of the powdery or granular material hopper 12 and serving as a powdery- or granular-material supplying means, and a container-flipping-type weighing device 94 serving as a weighing hopper. The container-flipping-type weighing device 94 has a container portion 94a for receiving a powdery or granular material, and a flipping motor 94b that flips over the container portion 94a upside down. The container portion 94a and the flipping motor 94b are supported by the load cell 15 and are configured so that the weight of the powdery or granular material within the container portion 94a can be measured. Dust-preventing bellows 18 are provided in between the slat valve 91 and the container-flipping-type weighing device 94, and at a connecting portion between the container portion 94a and the flipping motor 94b. Provided below the container-flipping-type weighing device 94 is a collecting chute 16 for collecting the powdery or granular material discharged from each of the container-flipping-type weighing devices 94 and for supplying a wrapping machine or the like.

In the powdery- or granular-material weighing apparatus of the present embodiment as well, a powdery or granular material is supplied to the container portion 94a of the container-flipping-type weighing device 94 by the slat valve 91, aiming at the individual target weight for each scale unit 90 as the target and, during that time, the powdery or granular material is supplied approximately at a constant flow rate without performing the large quantity charging and the small quantity charging, or similar controls. In addition, since the powdery or granular material is simultaneously supplied to a plurality of the scale units 90 and, moreover, it is sufficient that the powdery or granular material be supplied aiming at the individual target weight, which is one part in several of the target weight, it becomes possible to reduce the feeding time of the powdery or granular material. Furthermore, in the powdery- or granular-material weighing apparatus of the present embodiment, too, when there exist a plurality of such combinations of the scale units 90 that their total weights fall within a predetermined allowable range of a target weight, as in the powdery- or granular-material weighing apparatus of FIG. 1, it is also possible to adopt a configuration in which the powdery or granular material is discharged from the scale units 90 that constitute another combination independently of the next supply of the powdery or granular material to the container-flipping-type weighing device 94.

It should be noted that, although a feeding hopper is not provided in the present embodiment, it is possible to provide a feeding hopper between the cylindrical portion 71a and the cylindrical portion 74a in cases where there is leakage of the powdery or granular material from the slat valve 91. In addition, although the present embodiment employs the container-flipping-type weighing hopper, it is possible to use a gate-type weighing hopper as shown in FIG. 1, a pinch valve-type weighing hopper as shown in FIG. 7, and the like.

Figure 10:
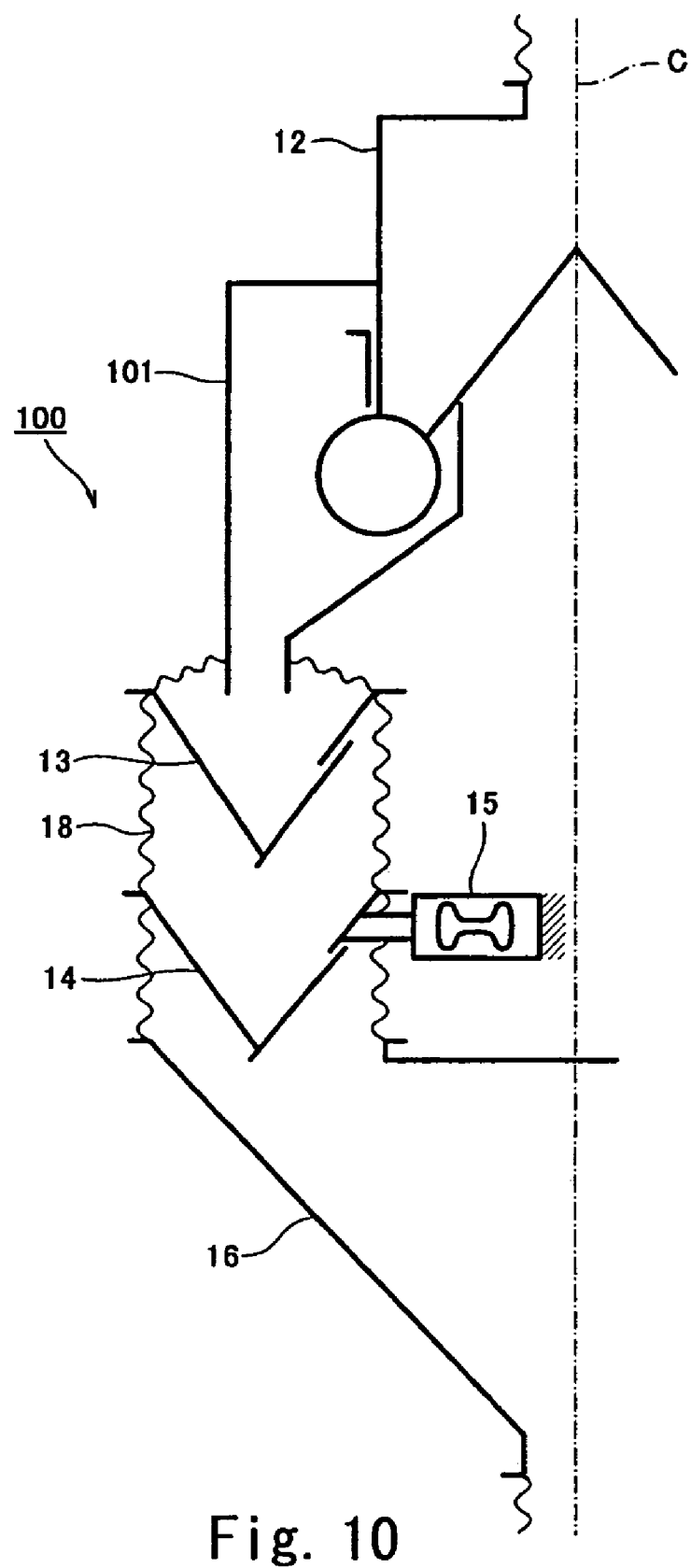
FIG. 10 is a schematic cross-sectional view of a powdery- or granular-material weighing apparatus having a roll feeder serving as a powdery or granular material-supplying means, according to a tenth embodiment of the present invention.

FIG. 10 is a schematic cross-sectional view of a powdery- or granular-material weighing apparatus according to a tenth embodiment of the present invention. Scale units 100 in the powdery- or granular-material weighing apparatus of the present embodiment are identical to the above-described scale unit 10 shown in FIG. 1, except that a roll feeder 101 is used as a powdery- or granular-material supplying means in place of the cut gate 11 in the scale unit 10, and identical corresponding parts are denoted by the same reference numerals.

In the powdery- or granular-material weighing apparatus of the present embodiment as well, a powdery or granular material is supplied from the roll feeder 101 to the feeding hopper 13 approximately at a constant flow rate without performing the large quantity charging and the small quantity charging, or similar controls, aiming at the individual target weight for each scale unit 100 as the target. In addition, since the powdery or granular material is simultaneously supplied to a plurality of the scale units 100 and, moreover, the powdery or granular material is supplied aiming at the individual target weight, which is one part in several of the target weight, it becomes possible to reduce the feeding time of the powdery or granular material. Furthermore, in the powdery- or granular-material weighing apparatus of the present embodiment, too, when there exist a plurality of such combinations of the scale units 100 that their total weights fall within a predetermined allowable range of a target weight, as in the powdery- or granular-material weighing apparatus of FIG. 1, it is also possible to adopt a configuration in which the powdery or granular material is discharged from the scale units 100 that constitute another combination independently of the next supply of the powder or granular material to the weighing hoppers 14.

It should be noted that, although the feeding hopper 13 is provided between the roll feeder 101 and the weighing hopper 14 in the present embodiment, it is possible to adopt a configuration in which the feeding hopper 13 is not provided, in cases where there is no leakage of the powdery or granular material from the roll feeder 101. In addition, although the present embodiment employs the gate-type weighing hopper 14, it is possible to use the previously described pinch valve-type weighing hopper shown in FIG. 7, the previously described container-flipping-type weighing hopper shown in FIG. 9, and the like.

Figure 11A:
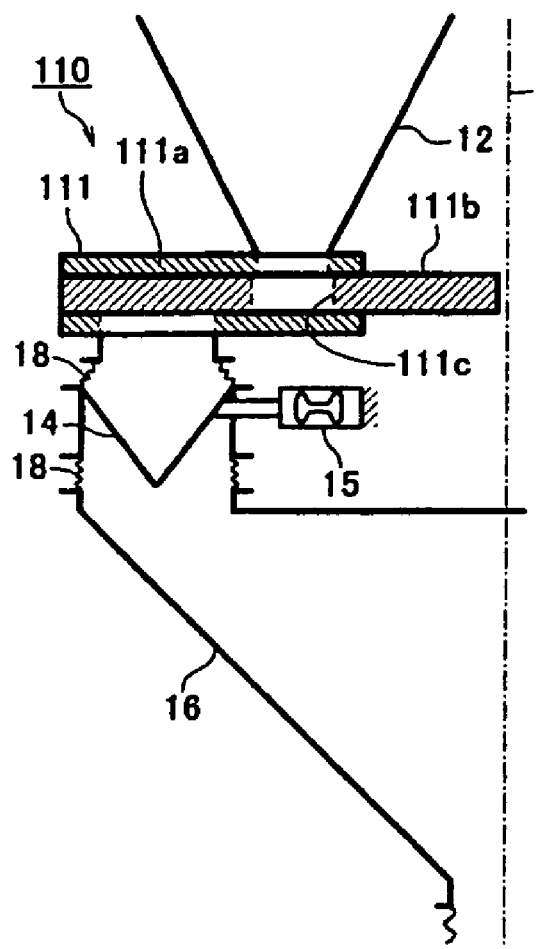
FIGS. 11a and 11b are schematic cross-sectional views of a powdery- or granular-material weighing apparatus having a volumetric feeder serving as a powdery or granular material-supplying means, according to an eleventh embodiment of the present invention.
Figure 11B:
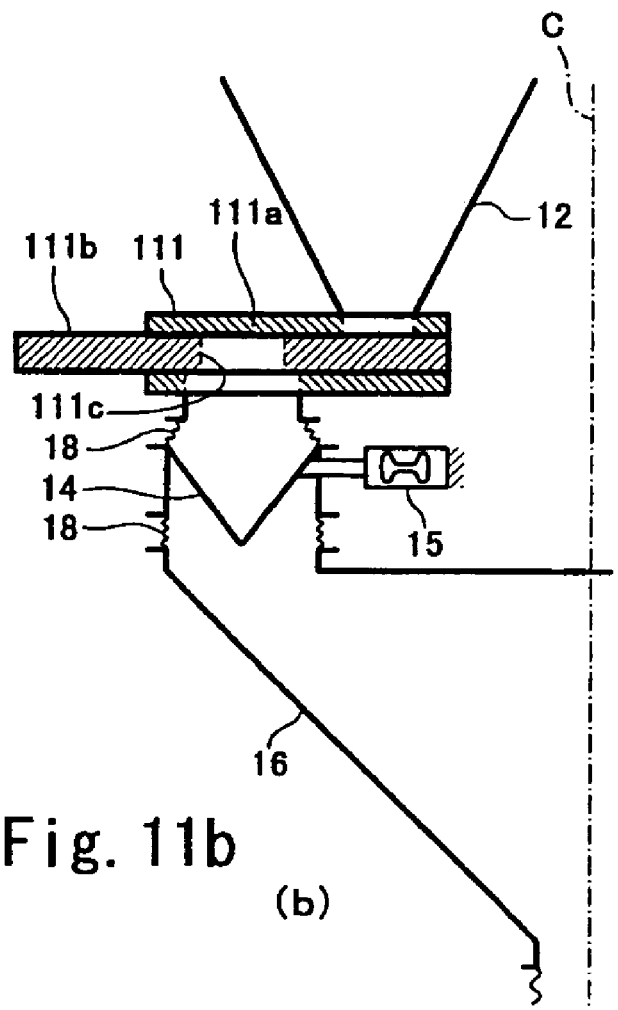

FIG. 11a and FIG. 11b are schematic cross-sectional views of a powdery- or granular-material weighing apparatus according to an eleventh embodiment of the present invention. A scale unit 110 in the powdery- or granular-material weighing apparatus of the present embodiment is provided with a volumetric feeder 111 attached to a lower portion of the powdery or granular material hopper 12 and serving as a powdery- or granular-material supplying means, and is not provided with a feeding hopper. The volumetric feeder 111 has a stationary portion 111a that is fixed to the powdery or granular material hopper 12 and the weighing hopper 14, and a movable portion 111b that slides within the stationary portion 111a, and the movable portion 111b is provided with a weighing hole 111c. As illustrated in FIG. 11a, a powdery or granular material is supplied into the weighing hole 111c in a state in which the weighing hole 111c of the movable portion 111b is located under the powdery or granular material hopper 12 and, next, when the movable portion 111b shifts and accordingly the weighing hole 111c reaches a position above the weighing hopper 14 as illustrated in FIG. 11b, the powdery or granular material is supplied to the weighing hopper 14. By such a reciprocating motion of the movable portion 111b, the powdery or granular material is supplied from the powdery or granular material hopper 12 to the weighing hopper 14.

In the powdery- or granular-material weighing apparatus of the present embodiment as well, a powdery or granular material is supplied from the volumetric feeder 111 to the weighing hopper 14 approximately at a constant quantity, aiming at the individual target weight for each scale unit 110 as the target. Moreover, since the powdery or granular material is simultaneously supplied to a plurality of the scale units 110, it becomes possible to reduce the feeding time of the powdery or granular material. Furthermore, in the powdery- or granular-material weighing apparatus of the present embodiment too, when there exist a plurality of such combinations of the scale units 110 that their total weights fall within a predetermined allowable range of a target weight, as in the powdery- or granular-material weighing apparatus of FIG. 1, it is also possible to adopt a configuration in which the powdery or granular material is discharged from the scale units 110 that constitute another combination independently of the next supply of the powder or granular material to the volumetric feeder 111.

Figure 12:
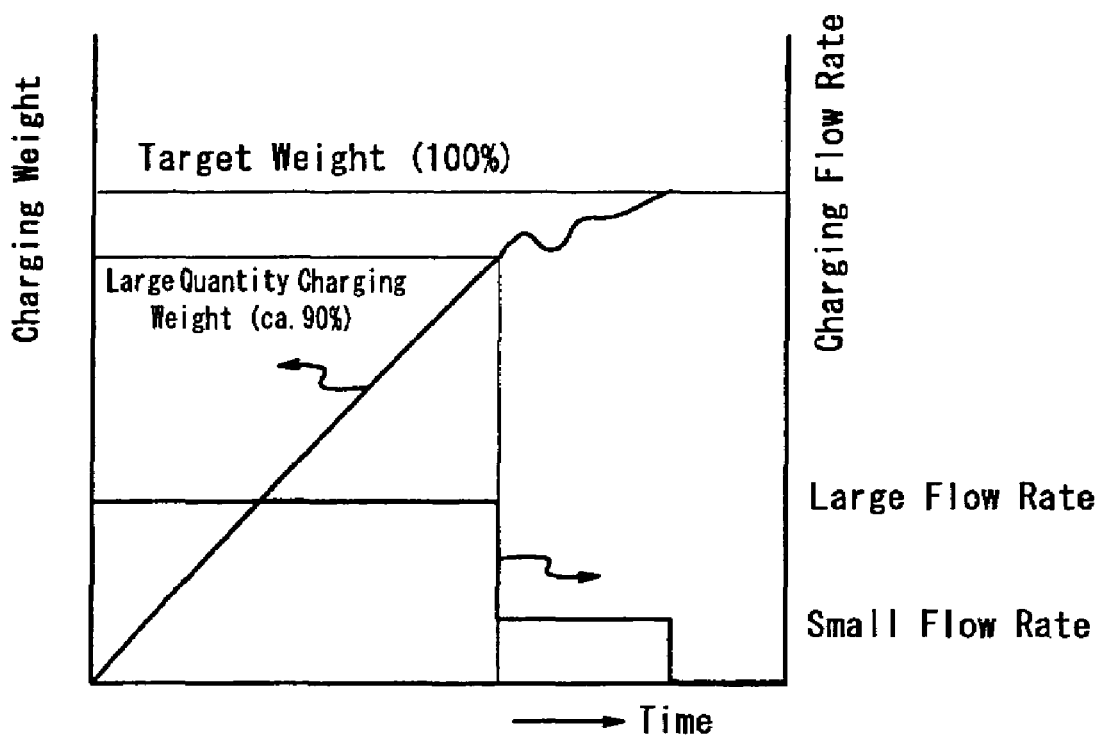
FIG. 12 is a graph representing the relationship of charging weight and charging flow rate with charging time in a conventional two-stage charging system.
Figure 13:
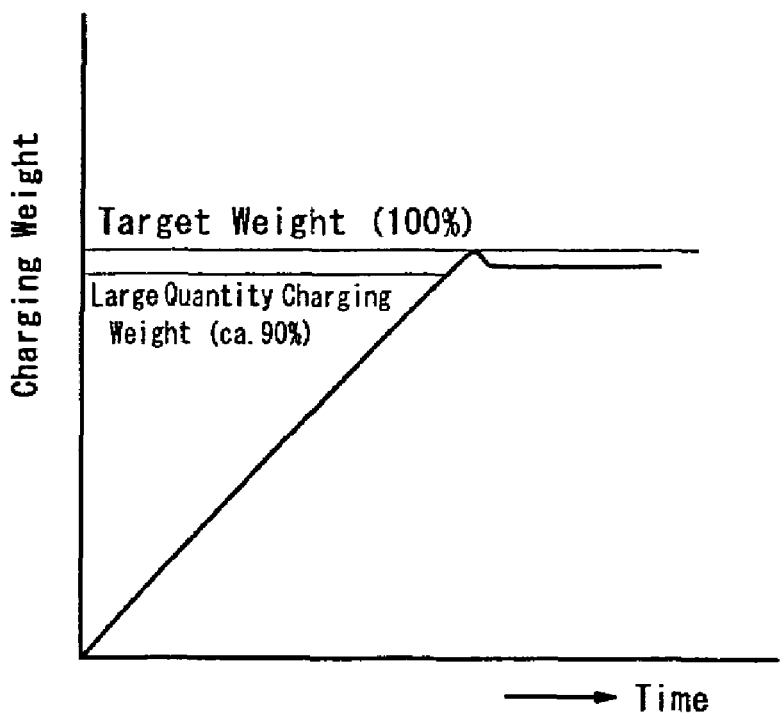
FIG. 13 is a graph representing an overshoot that occurs in a conventional powdery- or granular-material weighing apparatus.
Figure 14:
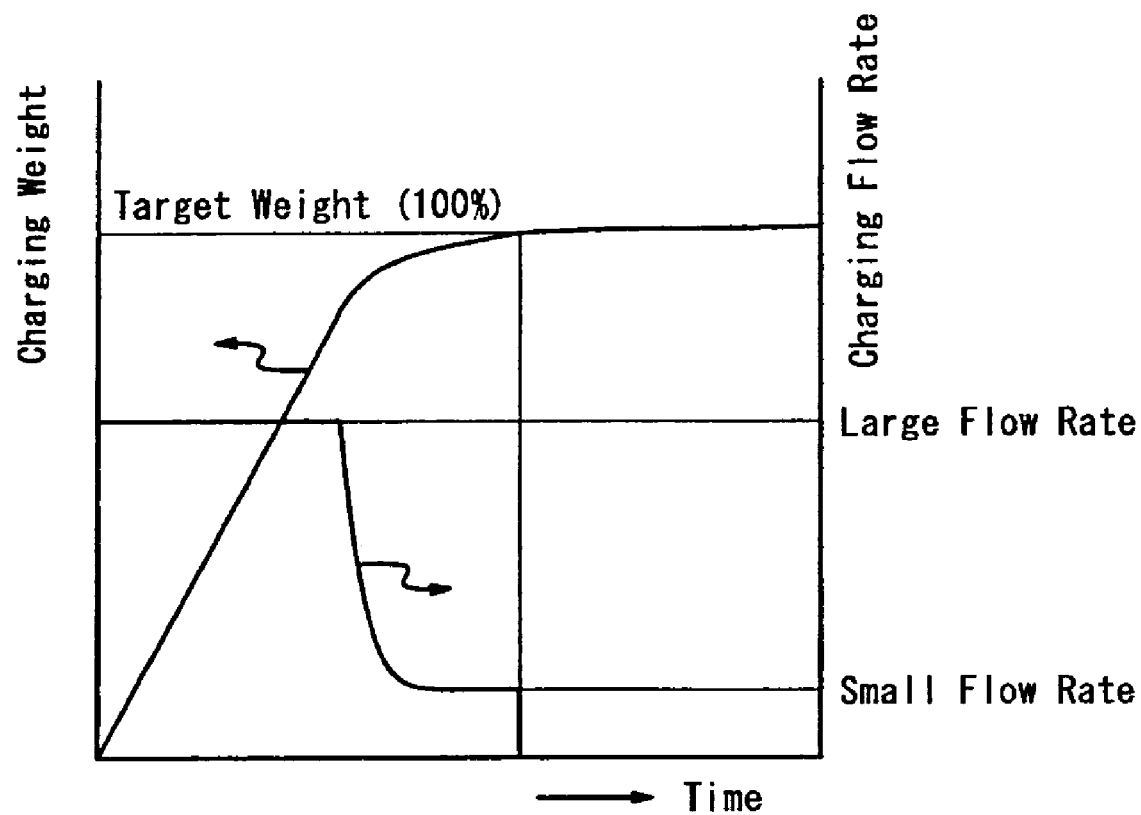
FIG. 14 is a graph representing the relationship of charging weight and charging flow rate with charging time in a conventional stageless system.

It should be noted that, although a feeding hopper is not provided in the present embodiment, it is possible to provide a feeding hopper between the volumetric feeder 111 and the weighing hopper 14 in cases where there is leakage of the powdery or granular material from the volumetric feeder 111. In addition, although the present embodiment employs a gate-type weighing hopper, it is possible to use the valve-type weighing hopper shown in FIG. 7, the container-flipping-type weighing hopper shown in FIG. 9, and the like. When the weighing speed of the respective powdery- or granular-material weighing apparatuses according to the foregoing embodiments was compared with that of a conventional powdery- or granular-material weighing apparatus, the conventional powdery- or granular-material weighing apparatus as shown in FIG. 12 to FIG. 14 showed a weighing speed of about 12 to 15 bags/minute, but the powdery- or granular-material weighing apparatuses of the present invention shown in FIGS. 1 to 11, which make use of a combination weigher, made a high-speed weighing at about 80 bags/minute possible.

It should be noted that, although the foregoing embodiments have described the cases in which a plurality of scale units are disposed around the center line C, the scales units may be disposed linearly.

INDUSTRIAL APPLICABILITY

In the powdery- or granular-material weighing apparatus of the present invention, since the powdery or granular material is supplied aiming at an individual target weight for a scale unit, which is one part in several of a target weight, is simultaneously charged into respective feeding hoppers or respective weighing hoppers, the charging time of the powdery or granular material can be reduced. Moreover, because a large quantity charging or a small quantity charging, or similar such controls as have been conventionally necessary, are unnecessary in supplying the powdery or granular material, a high-speed weighing for powdery or granular materials can be carried out at low cost. Furthermore, when there exist a plurality of such combinations of scale units that the total weights fall within a predetermined allowable range of a target weight, the powdery or granular material can be discharged from the scale units that constitute another combination independently of the next supply of the powdery or granular material to the weighing hoppers, so that it is possible to attain a further improvement in the weighing speed.

What is claimed is:

1. A powdery- or granular-material weighing apparatus for weighing a powdery or granular material within a predetermined allowable range of a target weight, the powdery- or granular-material weighing apparatus comprising:
    a plurality of scale units each for weighing a powdery or granular material, the plurality of scale units constituting a combination weigher which discharges the weighed material from the scale units which constitute a combination that attains, among totals for arbitrary combinations of a predetermined number of weighed values in the scale units, a total that is within the predetermined allowable range of the target weight; and
    a weighing hopper for weighing the material to be weighed;
    wherein each of the scale units is provided with a powdery- or granular-material supplying means for supplying the powdery or granular material to the scale units at a constant flow rate;
    wherein the powdery- or granular-material supplying means is selected from the group consisting of a belt feeder, a disk feeder, a screw feeder, a rotary feeder, an auger, a pinch valve, a wing feeder, a slat valve and a roll feeder; and
    weighing hopper comprises a cylindrical portion and a pinch valve for opening/closing a lower portion of the cylindrical portion.

2. A powdery- or granular-material weighing apparatus for weighing a powdery or granular material within a predetermined allowable range of a target weight, the powdery- or granular-material weighing apparatus comprising a plurality of scale units each for weighing a powdery or granular material, the plurality of scale units constituting a combination weigher which discharges the weighed material from the scale units which constitute a combination that attains, among totals for arbitrary combinations of a predetermined number of weighed values in the scale units, a total that is within the predetermined allowable range of the target weight; and
    a weighing hopper for weighing the material to be weighed;
    wherein each of the scale units is provided with a powdery- or granular-material supplying means for supplying the powdery or granular material to the scale units at a constant flow rate;
    wherein the powdery- or granular-material supplying means is selected from the group consisting of a belt feeder, a disk feeder, a screw feeder, a rotary feeder, an auger, a pinch valve, a wing feeder, a slat valve and a roll feeder; and
    wherein the weighing hopper comprises a receiving container that receives the material to be weighed and flips upside down.

3. The powdery- or granular-material weighing apparatus according to claim 1, wherein a dust generation-preventing means for preventing the powdery or granular material from generating dust is provided in between the powdery- or granular-material supplying means and the weighing hopper.

4. The powdery- or granular-material weighing apparatus according to claim 1, further comprising a collecting chute for collecting and discharging the weighed material from the scale units, and a dust generation-preventing means provided in between the weighing hopper and the collecting chute for preventing the powdery or granular material from generating dust.

5. The powdery- or granular-material weighing apparatus according to claim 2, wherein a dust generation-preventing means for preventing the powdery or granular material from generating dust is provided in between the powdery- or granular-material supplying means and the weighing hopper.

6. The powdery- or granular-material weighing apparatus according to claim 2, further comprising a collecting chute for collecting and discharging the weighed material from the scale units, and a dust generation-preventing means provided in between the weighing hopper and the collecting chute for preventing the powdery or granular material from generating dust.

* * * * *